No. 675,617. Patented June 4, 1901.
G. E. BARTHOLOMEW.
VELOCIPEDE BEARING.
(Application filed Oct. 4, 1900.)
(No Model.)
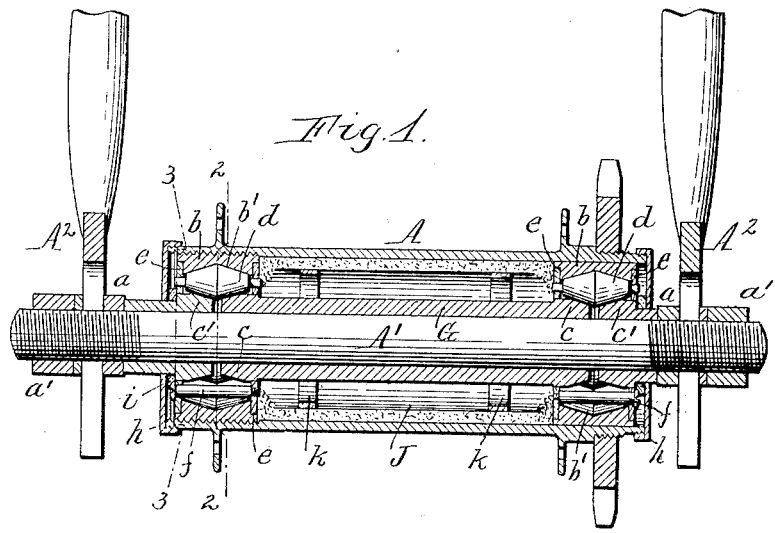
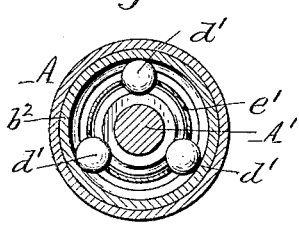
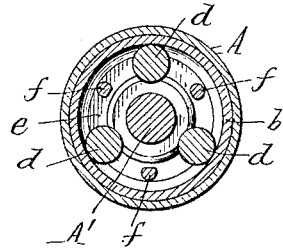
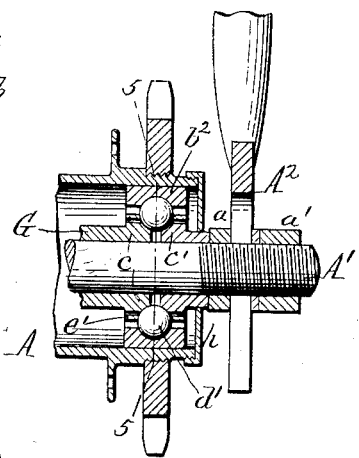
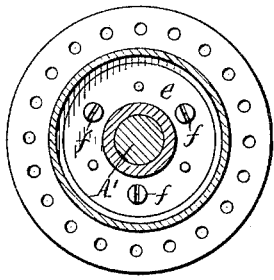
Witnesses:
E. A. Volk.
F. F. Scheyinger.
George E. Bartholomew, Inventor.
By Wilhelm & Bonner
Attorneys.

UNITED STATES PATENT OFFICE.

GEORGE E. BARTHOLOMEW, OF BUFFALO, NEW YORK, ASSIGNOR OF ONE-HALF TO ALBERT A. ENGLE, OF SAME PLACE.

VELOCIPEDE-BEARING.

SPECIFICATION forming part of Letters Patent No. 675,617, dated June 4, 1901.

Application filed October 4, 1900. Serial No. 31,984. (No model.)

*To all whom it may concern:*

Be it known that I, GEORGE E. BARTHOLOMEW, a citizen of the United States, residing at Buffalo, in the county of Erie and State of New York, have invented new and useful Improvements in Velocipede-Bearings, of which the following is a specification.

This invention relates to an antifriction-bearing which is especially desirable for the wheel-hubs of bicycles, but which is equally applicable to the wheel-hubs of automobiles and other vehicles.

The object of my invention is the production of a simple bearing in which the rollers or balls bear against the annular races practically at two opposite points, so as to avoid grinding of the same, and which at the same time permits the bearings at opposite ends of the wheel-hub or other casing to be adjusted simultaneously for taking up wear.

In the accompanying drawings, Figure 1 is a longitudinal section of the rear wheel-hub of a bicycle provided with my improved bearing. Figs. 2 and 3 are transverse sections in lines 2 2 and 3 3, Fig. 1. Fig. 4 is a fragmentary longitudinal section of the wheel-hub, showing a slight modification of the bearing. Fig. 5 is a cross-section in line 5 5, Fig. 4.

Like letters of reference refer to like parts in the several figures.

A is the casing of the bearing, which in the construction shown in the drawings consists of the body or barrel of a wheel-hub. A' is the stationary axle, which is clamped in the slotted fork ends A² by screw-nuts $a$ $a'$, applied to the axle on opposite sides of the fork ends.

Referring to the construction shown in Figs. 1, 2, and 3, each of the bearings consists of a ring or case $b$, arranged in the end of the hub, twin cones $c$ $c'$, arranged within said ring and surrounding the axle A', and rollers $d$, interposed between the ring $b$ and the opposing cones $c$ $c'$. The rollers are tapered from their middle toward both ends, or, in other words, consist of two cones placed base to base. The twin cones $c$ $c'$ of each pair are separated, and their opposing ends are beveled to fit the double-cone rollers. The ring $b$ is provided in its face with an annular groove $b'$, which is V-shaped in cross-section to fit the rollers, as shown in Fig. 1. The grooved ring $b$ of each bearing forms the outer wall of the annular roller-race, and the opposing beveled ends of the corresponding twin cones $c$ $c'$ form the inner wall of said race. The rollers of each bearing are held apart by vertical separating-rings $e$, seated in the ends of the ring $b$ and provided with openings which receive journals arranged at the ends of the rollers. The separating-rings of each bearing are secured in the ends of the bearing-ring by longitudinal screws $f$ or other suitable means. These screws are arranged to alternate with the rollers, and in the construction shown in the drawings three rollers and three connecting-screws are employed; but a greater number may be used, if desired.

The inner cones $c$ $c$ of the two bearings at opposite ends of the wheel-hub are connected together by a sleeve G, which loosely surrounds the axles, so that the same is free to slide lengthwise of the axle in adjusting the bearings. The connected cones $c$ may be formed integral with the sleeve G, as shown, or made separate from the sleeve and secured thereto, as desired. In the construction shown in the drawings the outer cones $c'$ are arranged loosely on the axle and held in position by the inner screw-nuts $a$. These cones may be engaged with the axle by a screw-thread, if desired.

$h$ represents dust-excluding caps applied to the ends of the wheel-hub, and $i$ represents washers, of felt or other suitable material, which surround the contracted outer portions of the outer cones $c'$ between shoulders of said cones and the caps $h$.

As shown in Fig. 1, one of the bearing-rings $b$—say the left-hand ring—is rigidly secured in the end of the wheel-hub by a screw-thread, as shown, or other suitable means, while the other bearing-ring is arranged loosely in the end of the hub, so as to be capable of sliding laterally or endwise therein.

In adjusting the bearings for taking up wear the right-hand outer cone $c'$, which forms part of the laterally-movable bearing, is screwed inwardly. This cone acting against the adjacent double-coned rollers shifts the same laterally toward the bearing at the opposite end of the hub, and said rollers in turn shift the cone-sleeve G in the same direction, thereby causing the inner cone $c$ of the left-hand bearing to approach its opposing twin cone $c'$ and taking up the wear of both bearings simultaneously. In adjusting the bearings the right-hand bearing-ring $b$ slides laterally with the corresponding rollers and thus permits of this simultaneous adjustment of both bearings. The cones $c\ c'$ of each pair are separated by a sufficient space to permit of the necessary lateral play of the cone-sleeve. Endwise play or displacement of the hub on the axle is prevented by the rollers of the rigid bearing. These rollers are held against lateral displacement by the groove formed between the opposing twin cones of said rigid bearing and in turn hold the hub against such displacement by their engagement with the groove of the rigid bearing-ring. By this construction a bearing is obtained in which the rollers bear practically at two opposite points, thus preventing grinding, and provision is made at the same time for adjusting the two bearings simultaneously.

J is a tubular lubricating-wick arranged in the wheel-hub between its bearings and abutting at its ends against the latter, so as to supply oil thereto. This wick is made of the proper diameter to fit snugly against the inner wall of the hub and is held against the same by rings $k$, which bear against the inner side of the wick. These rings are forced into the wick before the bearings are placed in the ends of the hub.

In the modified construction of the bearing shown in Figs. 4 and 5 balls $d'$ are substituted for the double-cone rollers of the first-described construction. In this case the annular groove of the bearing-ring $b^2$ is preferably concave to fit the balls and the opposing ends of the twin cones of the bearing are correspondingly formed. The balls are separated by a ring $e'$, having openings in which the balls are seated, as shown.

I claim as my invention—

1. The combination with a casing, of grooved bearing-rings arranged at opposite ends of the casing and each forming the outer wall of an annular race, one of said bearing-rings being held against lateral displacement in the casing and the other being capable of moving toward and from said fixed ring, a pair of bearing-cones arranged within each of said bearing-rings and forming together the inner wall of said race, a sleeve which connects the inner cones of the two sets and which is capable of moving laterally in the casing, and rolling bearing members interposed between each of said grooved rings and the opposing cones, substantially as set forth.

2. The combination with a casing, of bearings arranged at opposite ends of the casing and each comprising a ring provided in its inner face with a V-shaped annular groove, a pair of separated bearing-cones arranged within said ring and having their opposing ends beveled to correspond to said V-shaped groove, and double-cone rollers interposed between said grooved bearing-ring and the beveled faces of said opposing cones, the grooved ring of one of said bearings being held against lateral displacement in the casing and the corresponding ring of the other bearing being movable toward and from said fixed ring, and a sleeve which connects the inner cones of the two bearings and which is capable of sliding laterally in the casing, substantially as set forth.

Witness my hand this 2d day of October, 1900.

GEORGE E. BARTHOLOMEW.

Witnesses:
A. A. ENGLE,
CARL F. GEYER.